United States Patent [19]

Levenstein

[11] Patent Number: 5,566,305
[45] Date of Patent: *Oct. 15, 1996

[54] DUPLICATED LOGIC AND INTERCONNECTION SYSTEM FOR ARBITRATION AMONG MULTIPLE INFORMATION PROCESSORS

[75] Inventor: Sheldon B. Levenstein, Rochester, Minn.

[73] Assignee: International Business Machines Corporation, Armonk, N.Y.

[ * ] Notice: The term of this patent shall not extend beyond the expiration date of Pat. No. 5,463,741.

[21] Appl. No.: 462,673

[22] Filed: Jun. 5, 1995

Related U.S. Application Data

[62] Division of Ser. No. 962,625, Oct. 16, 1992, Pat. No. 5,463,749, which is a continuation of Ser. No. 581,843, Sep. 13, 1990, abandoned.

[51] Int. Cl.⁶ .................................................. G06F 13/00
[52] U.S. Cl. .......................... 395/299; 395/309; 395/730
[58] Field of Search ................................. 395/287, 299, 395/474, 478, 730, 856, 860

[56] References Cited

U.S. PATENT DOCUMENTS

| | | | |
|---|---|---|---|
| 4,096,569 | 6/1978 | Barlow | 395/325 |
| 4,096,571 | 6/1978 | Vander Mey | 395/425 |
| 4,115,851 | 9/1978 | Nagano | 395/425 |
| 4,385,350 | 5/1983 | Hansen | 395/325 |
| 4,394,727 | 7/1983 | Hoffman et al. | 395/650 |
| 4,402,046 | 8/1983 | Cox et al. | 395/200 |
| 4,467,418 | 8/1984 | Quinquis | 395/325 |
| 4,484,273 | 11/1984 | Stiffler et al. | 395/325 |
| 4,488,219 | 12/1984 | Lemaire et al. | 395/375 |
| 4,574,350 | 3/1986 | Starr | 395/725 |
| 4,604,694 | 8/1986 | Hough | 395/650 |
| 4,620,278 | 10/1986 | Ellsworth et al. | 395/325 |
| 4,621,342 | 11/1986 | Capizzi et al. | 395/325 |
| 4,663,708 | 5/1987 | Taub | 395/325 |
| 4,665,484 | 5/1987 | Nanba | 395/650 |
| 4,727,485 | 2/1988 | Keshlear et al. | 395/400 |
| 4,787,041 | 11/1988 | Yount | 395/775 |
| 4,805,106 | 2/1989 | Pfeifer | 395/650 |
| 4,807,111 | 2/1989 | Cohen et al. | 395/250 |
| 4,814,974 | 3/1989 | Narayanan | 395/725 |
| 4,920,486 | 4/1990 | Nielsen | 395/325 |
| 4,982,322 | 1/1991 | Eggers | 395/325 |
| 5,151,994 | 9/1992 | Wille et al. | 395/800 |

*Primary Examiner*—Ayaz R. Sheikh
*Attorney, Agent, or Firm*—Frederick W. Niebuhr; Karuna Ojanen

[57] ABSTRACT

An information processing network includes multiple processing devices, a main storage memory, and an interface coupling the processing devices to the main storage memory. All processing devices contend for control of the interface on an equal basis, subject to a dynamically shifting sequence of priority rankings, invoked to resolve contentions for the interface or for one of a plurality of hardware class locks. The class locks are uniquely associated with different capabilities or classes of data operations, which reduces the number of contentions and allows multiple operations to proceed simultaneously. Arbitration logic encompassing all of the processing devices is duplicated in each of the processing devices, and kept coherent through an interconnection of multiple data buses. One bus is associated with each processing device, receives the output of the associated processing device and provides the output to each of the other processing devices. A lock sequencer includes a store-tracking feature that minimizes the time that any processor, after losing a contention for a lock, is in a hold condition.

9 Claims, 8 Drawing Sheets

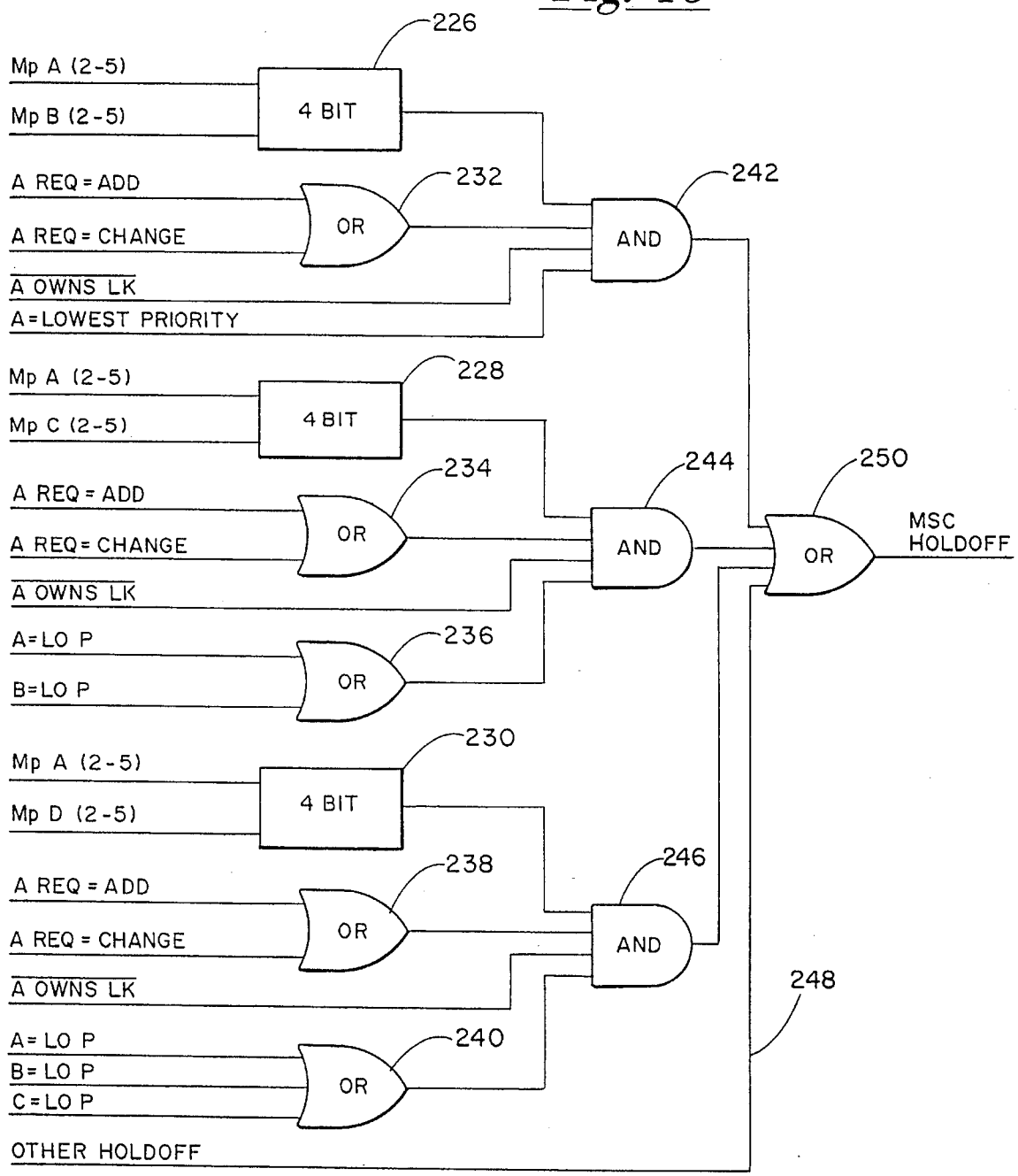

DUPLICATED LOGIC AND INTERCONNECTION SYSTEM FOR ARBITRATION AMONG MULTIPLE INFORMATION PROCESSORS

This is a divisional of application Ser. No. 07/962,625, filed on Oct. 16, 1992, now U.S. Pat. No. 5,463,749, as a continuation of application Ser. No. 07/581,843 filed Sep. 13, 1990 now abandoned.

BACKGROUND OF THE INVENTION

The present invention relates to information processing systems in which multiple processing devices are coupled to a main storage memory or other shared resource, and more particularly to means for allocating access to the shared resource among the processing devices.

Among the recent trends in data processing are computer architectures which increasingly employ multiple processing devices sharing a common interface to main storage. Multiple processor networks typically employ serializing mechanisms in order to protect shared data areas or objects in main storage. In the event that two or more of the processing devices simultaneously request access to a shared area of data within main storage, one or more of the serializing mechanisms resolves the conflict and grants access to one of the requesting devices. One approach to serializing among multiple processing devices is to configure each of the devices uniquely, such that the processing devices have different priorities. This type of system tends to favor the high priority processors at the expense of overall system performance.

It also is known to provide a central hub or controller coupled to all of the processing devices, but central hub systems require additional hardware. Test and set semaphores have been used to settle contentions among processing devices, yet such semaphores involve handshakes that require using shared data in main storage, increasing the required bandwidth to main storage and increasing the time necessary for data operations and contention resolution.

Therefore, it is an object of the present invention to provide a system of arbitration among multiple processing devices, that operates independently of main storage.

Another object is to provide an interconnection of multiple processing devices that maintains coherency among the processing devices without requiring a central hub.

A further object of the invention is to provide a means to serialize multiple instruction streams in a manner that resolves contentions among processing devices for shared objects in main storage and permits processors to run instruction streams in parallel.

Yet another object is to provide a network of multiple processing devices in which contentions are resolved rapidly, and the hold-off of any device losing contention for a shared object is reduced.

SUMMARY OF THE INVENTION

To achieve these and other objects, there is provided an information processing network, including a plurality of processing devices for executing computer program instructions to manipulate bit-encoded data. The network further includes a main storage memory or other resource shared by the processing devices, and an interface connected to the processing devices and to the shared resource, for transmitting bit-encoded data between each of the processing devices and the shared resource. Each processing device includes an arbitration sector. Each arbitration sector contains arbitration logic for determining a priority among all of the processing devices for access to the shared interface. The arbitration sectors of the various processing devices are substantially identical to one another. An interconnection means is provided for directly coupling all of the arbitration sectors to one another. This maintains coherency of the arbitration logic in all of the arbitration sectors.

The preferred interconnection means is a plurality of data buses, equal to the number of processing devices. Each data bus is associated with one of the processing devices, in the sense that it receives data from the arbitration sector of its associated processing device, and provides this data to the arbitration sectors of all of the other processing devices.

The arbitration sectors include both general and processor-specific information. The general information concerns, for example, arbitration for the shared interface to main storage. As to specific information, each arbitration sector has a plurality of arbitration registers, each arbitration register containing information specific to a different one of the processing devices. One of these registers contains information specific to the processing device in which it resides, and provides the output to the associated bus. The remaining arbitration registers are input registers that receive logic from the remaining processing devices via the remaining data buses.

Each of the arbitration sectors further includes information uniquely identifying the associated processing device, logic for resolving contentions among the processing devices for shared objects in main storage, and a means for dynamically altering the priority rankings of the processing devices responsive to each contention. Thus, each processing device alone contains sufficient logic for resolving contentions among all of the processing devices, eliminating the need for a central hub and the need to resort to main storage for conflict resolution. As compared to conventional networks, a data processing network according to the present invention is thus more compact and requires less "bureaucracy", for substantially improved performance.

Another feature of the present invention resides in a serializing system for resolving contentions in the information processing network. The system includes a plurality of hardware locks, each of the locks uniquely corresponding to one of a plurality of subsets of the data in the main storage memory. The system further includes an access means in each of the processing devices for acquiring data in main storage. Each access means has a control store means containing computer program instructions, including control instructions for performing operations on data. Each access means further includes means for acquiring control of at least a selected one of the locks, as a condition precedent to performing data operations on data corresponding to the selected lock. A signaling means generates a lock-acquired signal responsive to the processing device gaining control of the selected lock. Further, an inhibit means provides the lock-acquired signal to the other processing devices, to prevent the other devices from acquiring control of the selected lock.

Each access means preferably includes a means to provide a lock-released signal to the other processing devices, to enable the other devices to acquire control of the selected lock once released.

Preferably, each hardware lock is uniquely associated with a designated operational capability, with the data corresponding to the lock comprising all bit-encoded data relating to the designated capability. This enables two or more of the processing devices to perform data operations simultaneously, so long as the devices are in control of different class locks.

This arrangement permits multiple atomic instruction sequences to run in parallel, and reduces conflict due to the plurality of class locks. The locks reside in the processing devices, and thus eliminate the need for access to main storage in resolving contentions.

Another feature of the invention resides in a process, in the data processing network, for permitting access to a lock once the lock is released by another processing device. The process includes the following steps:

monitoring each of the processing devices for one of three lock conditions including: (i) an idle condition indicating none of the locks is controlled by a particular processor; (ii) a locked condition indicating that a lock has been acquired and is controlled by the particular processor; and (iii) a free condition indicating that the processor has released the lock, but at least one data store operation associated with the lock is not yet complete;

tracking the final data store operation performed by the processing device controlling the lock; and responsive to the reading of the location associated with the final store operation in the cache memory directories of all of the processors, forcing the particular processor from the free condition to the idle condition, thereby enabling the other processors to acquire the lock during the following clock cycle.

Thus, previously controlled locks are made available to other processing devices while a final store to main storage memory is still outstanding, eliminating the requirement for another processor seeking the same lock to wait until the store is complete. This also permits the processor that controlled the lock to proceed to other data operations, rather than waiting for the store to be purged from the cache memories of all of the other processing devices.

In combination, the interconnection of the processing device arbitration sectors, the duplication of logic throughout all arbitration sectors, the use of multiple class locks to control access to shared resources, and the collision resolution logic in connection with the locks, provide a multiple processor network with effective, balanced use of all of the processing devices, and rapid arbitration among the devices sharing main storage memory. Since each processing device individually contains all hardware and logic necessary for contention resolution, any processors added to upgrade the network incorporate the necessary conflict resolution logic, for straightforward, cost effective system upgrades.

IN THE DRAWINGS

For a further understanding of the above and other features and advantages, reference is made to the following detailed description and to the drawings, in which:

FIG. 10 is a logic diagram of tie breaking circuitry for allocating hardware locks in accordance with the present invention.

DETAILED DESCRIPTION OF THE PREFERRED EMBODIMENT

To facilitate an understanding of the preferred embodiment, this description begins with a brief explanation of certain terms used to describe the operation and features of the invention.

IMPI Instructions: Assembly level computer program instructions in microcode. Processing devices execute IMPI instructions sequentially in performing logical operations on data, e.g. store, add, and move-character functions.

IMPI Task (or Data Operation): A synchronous execution of one or more IMPI instruction streams comprising a unit of work executed or executable by a processing device. Each IMPI stream includes data used by the stream, and the parameters necessary for transferring information to or from other IMPI streams.

Horizontal Microcode (HMC): Microcode that interprets IMPI instructions, i.e. decomposes the IMPI instructions into a series of simpler steps. HMC instructions also are called control words, and govern the state of the hardware.

Figure 1:
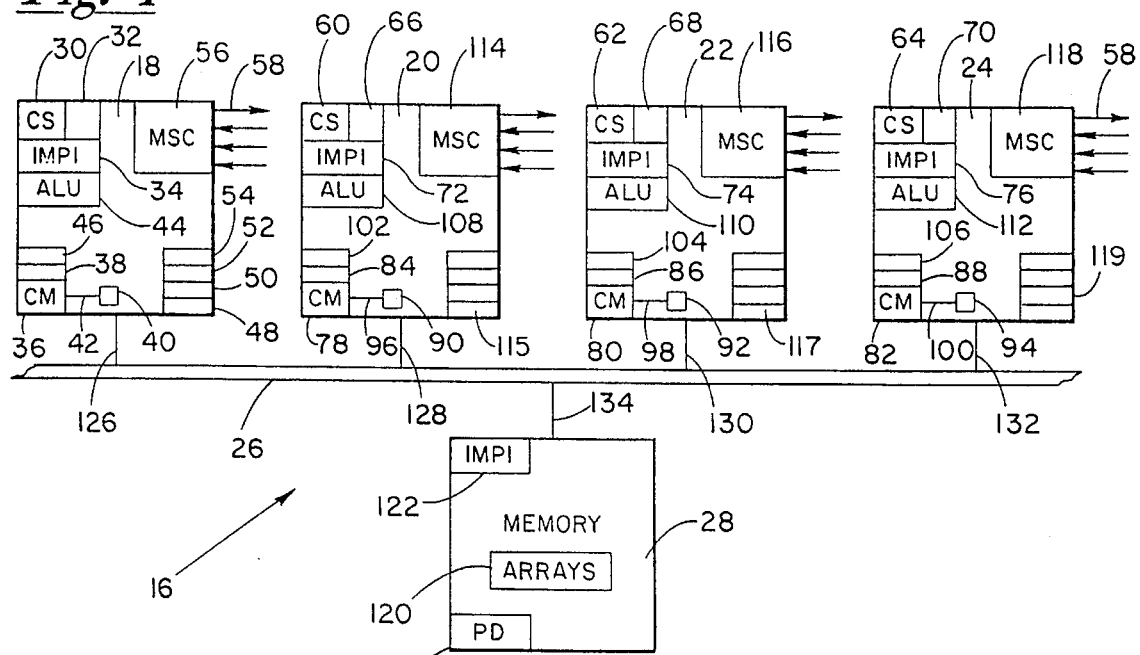
FIG. 1 is a schematic view of an information processing system in which multiple processing devices share a main storage memory through a common interface.

Turning now to the drawings, there is shown in FIG. 1 an information processing network 16 for storing and performing various operations upon bit-encoded data. The network in this example includes four processing devices indicated at 18, 20, 22 and 24, but more or fewer processing devices could be used. A main storage interface 26 couples the processing devices to a main storage memory 28.

Processor 18 includes a control store 30 containing the horizontal microcode (HMC) and a control store output register 32. The processing device further includes an array of general purpose IMPI registers 34. When an IMPI task is switched into processor 18 for execution, data and IMPI instructions pertinent to the task are loaded into registers 34 either from main storage memory 28 or from a cache memory 36 of the processor. When the task is switched out of processor 18, processor data is stored to the main storage memory, and also may be stored to the cache memory, if the associated cache lines are valid.

Cache memory 36 is a one-way associative store-through cache having a plurality of cache lines associated with a particular set of addresses or locations in the main storage memory. Cache memory 36 further includes a cache directory 38. The cache directory is a record of the main storage memory addresses mapped into the cache memory, and stores an indication of whether each corresponding location in the cache memory is valid or invalid. As indicated at 40, processor 18 includes logic (in the form of semiconductor chip circuitry) for fetching and storing data, including fetches and stores to and from cache memory 36 via a cache interface 42. The processor includes logic 44 for performing arithmetic operations on data, and a look-aside buffer 46, which is a record of certain virtual addresses mapped to real addresses.

Processor 18 includes a plurality of latches for address and command data transmitted between the processor and interface 26, including a main storage command register 48 and a stack of three real address buffers indicated respectively at 50, 52 and 54.

Processing device 18 has an arbitration sector or main storage control 56. Arbitration links at 58 interconnect main storage control 56 with substantially identical arbitration sectors of the other processing devices, and are used in combination with arbitration logic residing in the arbitration sectors to assign priority to any one of the processing devices, in terms of (1) access to interface 26 between the processors and the main storage memory, and (2) acquiring control of hardware locks as is later explained.

Processing devices 20, 22 and 24 are similar to processing device 18, and include respective control stores 60, 62 and 64 and respective control store output registers 66, 68 and 70; respective IMPI register arrays 72, 74 and 76; respective cache memories 78, 80 and 82; respective cache directories 84, 86 and 88; respective logic at 90, 92 and 94; respective cache interfaces 96, 98 and 100; respective look-aside buffers 102, 104 and 106; respective arithmetic logic at 108, 110 and 112; and respective arbitration sectors 114, 116 and 118. Each of these devices further includes a main store command register and real address buffers, indicated at 115, 117 and 119. These components function in substantially the same manner as their counterparts in processing device 18. Accordingly, each of the processing devices has the same ability to gain control of IMPI tasks, although only one of the processing devices can control a particular task at any given time.

Main storage memory 28 includes memory storage arrays 120 for storing bit-encoded data, and a program instruction store 122 in which the IMPI instructions are embedded. A primary directory 124 resides in the main storage memory, and is a complete record of the virtual addresses that correspond to real addresses. Look-aside buffers 46, 102, 104 and 106 each correspond to a portion of the primary directory. Preferably, main storage memory 28 is comprised of multiple individual memory cards, each having its own memory arrays and its own instruction segment, the segments cooperating to provide the IMPI instructions.

Interface 26 can include a plurality of separate buses (not shown) each shared in common by all of the processing devices and memory cards of main storage. For example, working data (the information of most direct concern to the users of the network) is transmitted over a working data bus. A command/address bus transmits information controlling the transmissions of working data, including information as to the address in main storage memory 28 at which working data is to be stored or retrieved. A communication bus transmits the status of working data as the working data is transmitted via the data bus. For more detailed information on this type of interface, reference is made to U.S. patent application Ser. No. 07/445,320 entitled "High Performance Shared Main Storage Interface", filed Dec. 4, 1989 and assigned to the assignee of the present application. Data lines 126, 128, 130 and 132 connect processing devices 18, 20, 22 and 24 to interface 26. A data line 134 connects the interface to main storage memory 28, although in the case of multiple memory cards, each card of course has its own data line to the interface.

Figure 2:
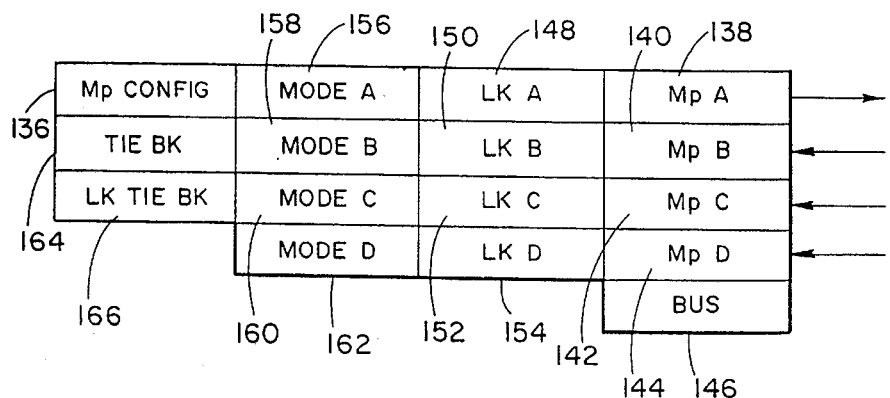
FIG. 2 is a diagrammatic view of an arbitration sector of one of the processing devices.
Figure 3:
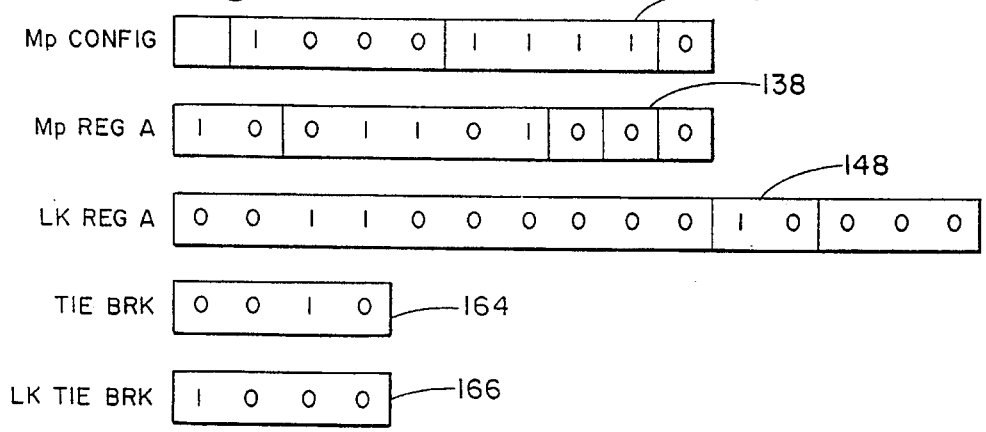
FIG. 3 is a representation of selected registers of the arbitration sector.

As seen in FIG. 2, arbitration sector 56 includes a plurality of registers for bit-encoded data, some of which are shown in greater detail in FIG. 3. Arbitration sectors 114, 116 and 118 have identical registers, and logic in all four arbitration sectors is in the identical state. Thus, the main storage control logic is duplicated in all four of the processing devices. It is to be understood, however, that most of the logic in each processor is nonduplicated, i.e. unique to that processor.

As hardware, the registers in main storage controls 56, 114, 116 and 118 are identical to one another. The logic or information contained in the registers varies slightly from one processing device to another, since the registers contain not only general logic, but processor-specific logic as well. A configuration register 136 of arbitration sector 56 contains a unique processor identification in a field of bit positions 1–4, which of course is processor-specific. The binary "1" in bit positions 1 identifies processor 18 as the "first" processor in the sequence of four. The corresponding field in processor 20 would be "0100". The field including bit positions 5–8 is the same in all configuration registers, and indicates how many of a possible four processing devices are actually part of the network. The binary "1111" in configuration register 136 indicates that all four processors are connected. Finally, bit position 9 determines the nature of a tie breaking feature of the invention, to be explained. More particularly, a binary 0 causes the tie breaking feature to shift processing device priority according to a random generator, while a binary 1 causes a sequential priority shift.

Arbitration sector 56 further includes four multiprocessor (Mp) registers A–D at 138, 140, 142 and 144. Each of these registers contains processor-specific information. Register 138 (Mp A) contains information specific to processing device 18, and is an output from this processing device into the arbitration linkage or interconnection. Registers 140, 142 and 144 (Mp B–C) are each specific to one of processing devices 20, 22 and 24 are inputs to processor 18 from the interconnection. A bus monitor register 146 contains information as to priority among the processing devices for control of interface 26, and is both an input and an output of the processing device. Register 146 also is used in providing information as to the need to purge a line in the cache memory, and to generate a cycle "steal" for this purpose. For a more detailed explanation of the purge and cycle steal, reference is made to U.S. patent application Ser. No. 07/468, 048 entitled Fast Store-Through Cache Memory, filed Jan. 22, 1990 and assigned to the assignee of this application.

Considering register 138 in greater detail (FIG. 3), bit positions 0 and 1 indicate the current mode of operation for processing device 18. In this case the binary "10" indicates a cache memory fetch. Alternative modes include:

| | |
|---|---|
| 00 | No cache memory access |
| 01 | Cache memory store |
| 10 | Cache memory fetch |
| 11 | Primary directory search |

Bit positions 2–6 identify one of ten hardware class locks and a command (add lock, change lock, or release lock) associated with the particular lock identified In this instance, "0110" is the binary identification of lock number 6, while the binary 1 in the sixth bit position indicates a command to add lock number 6. Bit position 7 concerns a request for interface 26, bit position 8 is available for indicating a purge of a cache memory line, and bit position 9 is for parity.

For a further understanding of hardware class locks, one of the salient features of the present invention, it is appropriate to consider "atomic" tasks or operations. An operation on bit-encoded data is atomic if it appears to be calculated instantaneously from the inputs. In connection with main storage memory, an operation appears atomic if its source operands are not allowed to change between the time that they are fetched from the main storage memory, and the time that results of the operation are stored back to main storage. The stored results then are correct for the inputs at the time of the store. In a network with multiple processing devices, operations can be insured to be atomic only if conflicting attempts among processing devices, to gain access to main storage, are detected and delayed until the current operation is complete. Yet, performance of a multiprocessor network is enhanced if the number of atomic operations is kept to a minimum.

Accordingly, most IMPI instructions are not atomic per se. Rather, selected IMPI instructions are atomic only relative to other instructions that operate on the same type of shared objects in main storage memory 28. IMPI operations involving such instructions are thus deemed "relatively atomic operations". For these operations, the inputs are not changed by another operation of the same type, from the time an operation first references an input to the time the operation stores its results. Shared objects are divided into object classes. Each class of operation is protected by one of the hardware class locks.

Processing network 16 utilizes ten hardware class locks, each of which corresponds to a capability, i.e. a type of operation on data, rather than a specific address or set of addresses. For example, one of the locks controls access to primary directory 124, another lock controls compare and swap instructions, another lock controls the task dispatcher, and yet another lock controls the I/O queues. Any one of processing devices 18, 20, 22 and 24 can acquire control of any number of the locks, from one to all ten. By contrast, lock control is exclusive in that only one of the processing devices can acquire and retain a given lock at any one time. In a multiprocessor network, this provides operations or tasks that are atomic as to their corresponding classes, yet allows multiple operations to run in parallel. Locks are acquired, and conflicts for locks are resolved, entirely within the processing devices and their interconnection. These functions proceed much more rapidly, since no interaction with main storage memory is required.

Returning to FIGS. 2 and 3, arbitration sector 56 includes four lock registers 148, 150, 152 and 154 (LK A–D). Each lock register contains processor-specific information and corresponds to one of the Mp registers, i.e. register LK A corresponds to register Mp A, etc.

Bit positions 0–9 of each lock register identify the hardware locks currently held. For example, the binary 1 in each of bit positions 2 and 3 of register 148 (FIG. 3) indicates that locks 2 and 3 are active in (held by) processing device 18.

Bit positions 10 and 11, and bit positions 12–14, respectively concern a mode sequencer and a store-tracking (WIS) sequencer, both of which are described below. More particularly, the "10" in bit positions 10 and 11 indicates a "locked" condition or state of processing device 18. In other words, at least one of the class locks is active in processor 18. The "000" in bit positions 12–14 indicate a "null" state in the tracking sequencer. Other binary combinations indicate the location of a store being tracked by the store-tracking sequencer, as follows:

| | |
|---|---|
| 110 | RAB 3 (Buffer 54) |
| 100 | RAB 2 |
| 010 | RAB 1 |
| 011 | MSCMD (Register 48) |
| 001 | MP READ A |

The entry "MP READ A" identifies the bus monitor register, e.g. register 146 of processing device 18. This entry further indicates that the store operation being tracked is complete, but that the class lock involved is held by processing device 18 until a purge of the MP directory (a copy of the cache directory), if necessary.

Arbitration sector 56 further includes four mode registers A–D, indicated at 156, 158, 160 and 162. Each of these registers corresponds to its associated one of registers Mp A–D, and provides the mode information to the first and second bit positions of its associated Mp register.

Finally, the arbitration sector includes a tie break register 164 and a lock tie break register 166. Each of these registers, depending upon the bit position of a binary 1, indicates the priority of processing device 18, register 164 as to bus arbitration for control of interface 26, and register 166 as to acquiring one of the hardware class locks.

In each of these registers, the binary 1 specifically identifies the bit position of the lowest priority processing device, but also determines the priorities of all processing devices, based upon the sequence of bit positions. More particularly, the binary 1 in tie break register 164 identifies processing device 22 as having the lowest priority, and further indicates that processing device 24 has the highest priority. Device 18 is next highest, followed by device 20. As to acquiring locks, the binary 1 in register 166 identifies processing device 18 as the lowest priority device, with processing device 20 highest in priority, followed by device 22, then device 24.

Priority assignments are dynamic, i.e., changing with each event of interface arbitration (register 164) or lock arbitration (register 166). In register 164, this shift is round robin or rotational, i.e. a shift of the binary 1 a single bit position to the right. In connection with lock tie break register 166, the shift also can be round robin, and is round robin if bit position 9 in configuration register 136 contains a binary 0. By contrast, a binary 1 causes a random shifting in register 166, driven by a random generator.

Figure 4:
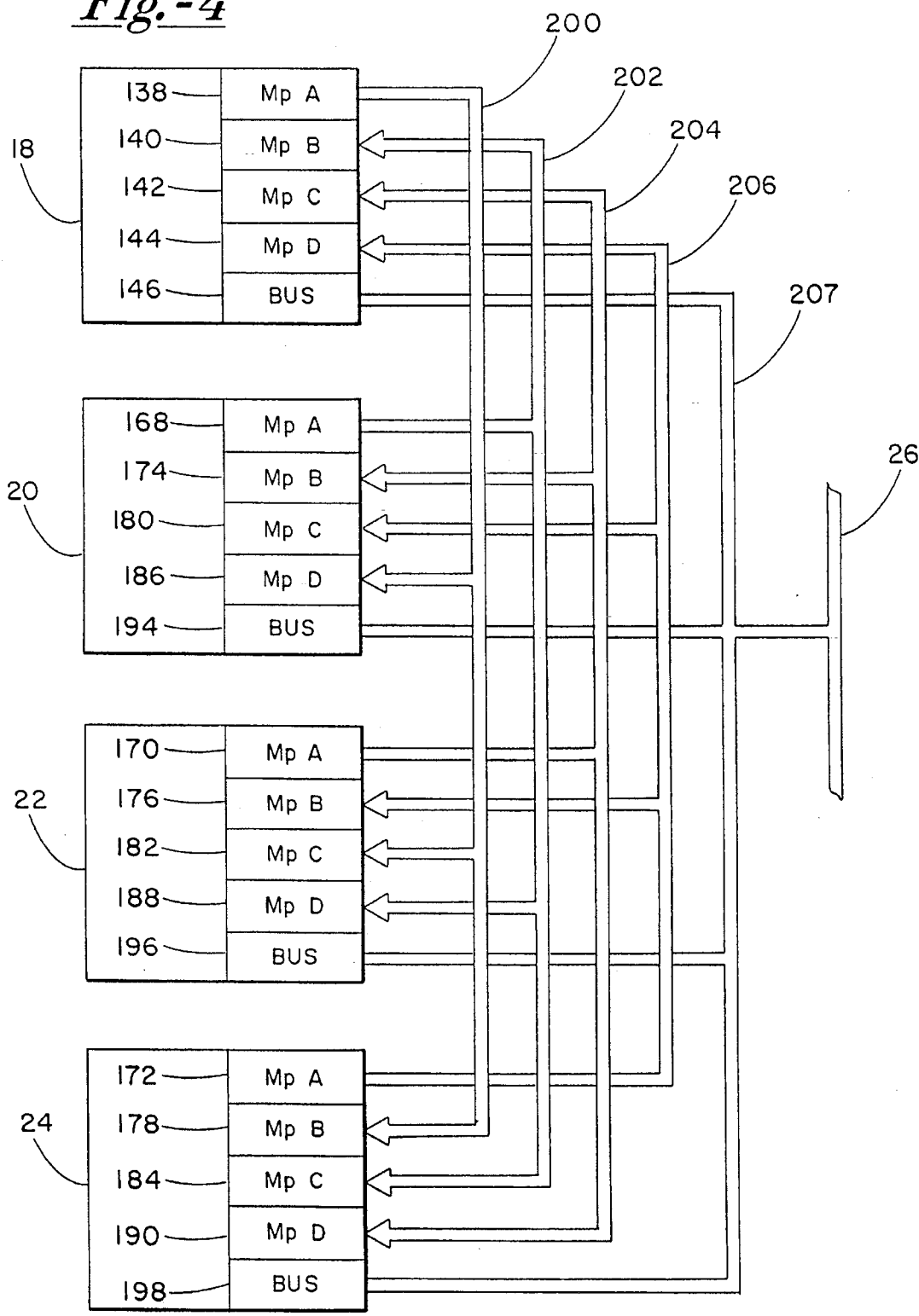
FIG. 4 is a schematic view of a data bus interconnection of the processing devices.

The logic in registers Mp A–D, LK A–D and mode A–D is identical for all of the processing devices. However, the logic in register Mp A is different in each one of the processing devices. Likewise, the contents of each of the registers Mp B, Mp C and Mp D differs from one processing device to another. The reason is apparent from FIG. 4, illustrating the arbitration links or interconnection 58 of the processing device. Processing devices 20, 22 and 24, in their respective arbitration sectors, include respective Mp A registers 168, 170 and 172; Mp B registers 174, 176 and 178; Mp C registers 180, 182 and 184; and Mp D registers 186, 188 and 190. The processors include corresponding bus monitor registers 194, 196 and 198.

Each of the Mp A registers is an output register for its associated processing device, and provides its contents to one of four ten-bit data buses 200, 202, 204 and 206. The ten-bit capacity of each data bus corresponds to the ten-bit positions in the Mp registers. Thus, each of data buses 200–206 virtually instantaneously transmits the logic from its associated register Mp A to one of the input registers (Mp B–D) in each of the other processing devices. Further, buses 200–206 form a round robin or sequential interconnection among the processing devices, whereby all four processing devices have the same status. The round robin interconnection corresponds to the priority relationship discussed above in connection with tie breaking registers 164 and 166. In other words, there is a descending priority sequence in shifting one bit position or one "processor" to the right, except for the rightward shift from the lowest priority to the highest priority. For processor 18, this sequence arises from register 138 (Mp A) providing its output to data bus 200, and receiving inputs from succeeding data buses 202, 204 and 206 at succeeding registers 140 (Mp B), 142 (Mp C) and 144 (Mp D). In processing device 20, the output of register 168 (Mp A) is provided to data bus 202, while buses 204, 206 and 200 provide the B–D input sequence. Processing devices 22 and 24 each exhibit the same sequence, the only difference being the "beginning" data bus receiving the Mp A register output.

Each of data buses 200–206 is connected to the processing devices in a reverse or leftward sequence. For example, data bus 200 is associated with processing device 18 in the sense that it receives the output of Mp A register 138. This bus provides its output to Mp D register 186 of device 20, Mp C register 182, and Mp B register 178. The logic in registers 138, 178 182 and 186, thus, is identical. Each of the remaining data buses 202–206 likewise connects the processing devices in the reverse sequence, the only difference being the processing device from which each bus receives the Mp A register output.

Bus monitors 146, 194, 196 and 198 are bi-directional and connected to one another and to interface 26. Thus, each of the processing devices is continually informed of which processor currently controls the interface.

As a result of this interconnection, each processing device is equal in status, and views itself as "processor A". Tie break registers 164 and 166 are maintained according to the A–D system. In particular, tie break register 164 of processing device 18 identifies "processor C" as having the lowest priority. The corresponding tie break register of processor 22 (not shown) would contain the binary word "1000" attributing the lowest priority to "processor A". Of course, each configuration register uniquely identifies its associated processing device in bit positions 1–4.

Figure 5:
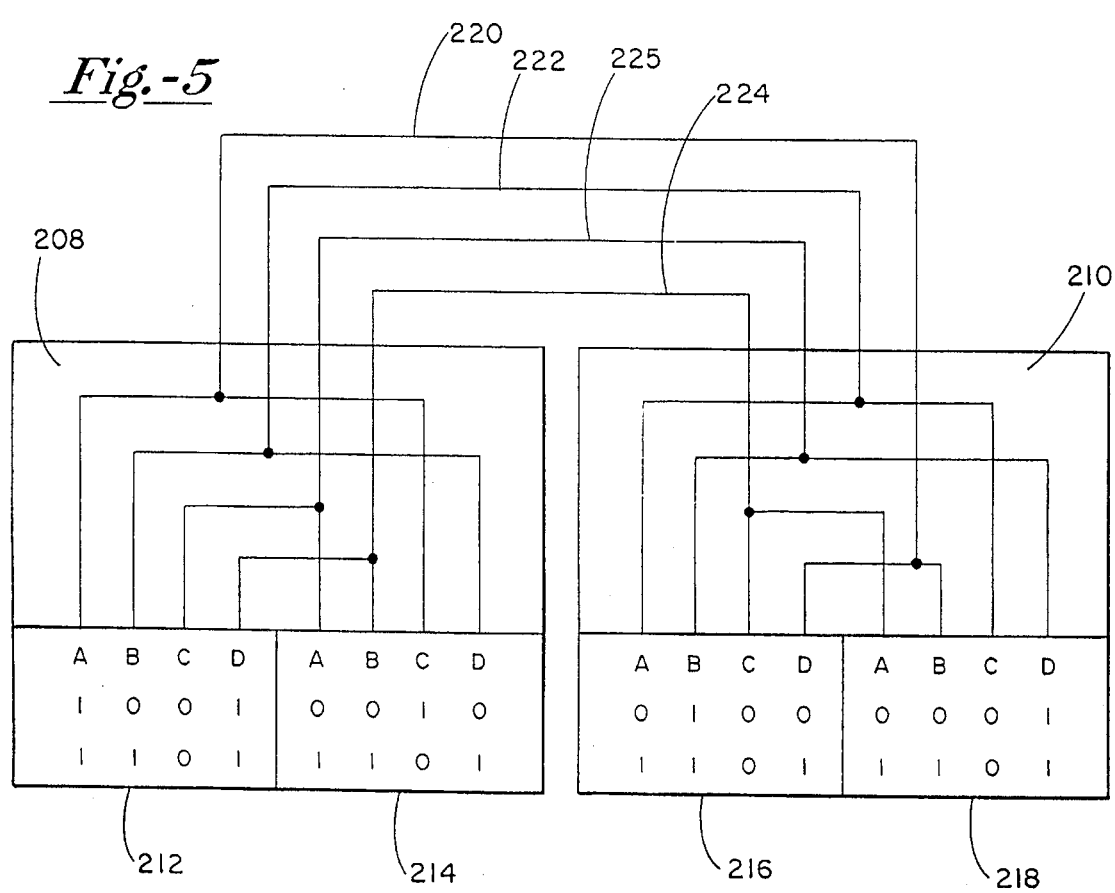
FIG. 5 illustrates an implementation of a three-processor network including a dyadic processor card and a uniprocessor card.

FIG. 5 illustrates an example of a network involving three processing devices, in the form of a uni-processor card 208 and a dyadic processor card 210, along with respective Mp configuration registers 212 and 214 on the uni-processor card, and configuration registers 216 and 218 on the dyadic processor card. Each configuration register exhibits a unique processor identification. The installed processor field is identical, indicating that the processing device corresponding to the third bit position is not installed. Accordingly, the network requires three data buses at 220, 222 and 224. A data bus 225 is not used, but would be employed if both processor cards were dyadic.

Hardware class locks, discussed previously in connection with FIGS. 2 and 3, are the serialization mechanism for processor network 16. The locks serialize different horizontal microcode (HMC) instruction streams against one another. Hardware class locks afford a substantial advantage over conventional serialization mechanisms, because they do not involve main storage memory, and multiple locks can be active at one time, running in parallel with one another.

The mechanism by which any one of processing devices 18–24 gains control of a class lock, is a 6 bit lock field available in every HMC control word. Four of the bit positions identify the particular lock, of ten available hardware class locks involved. One bit position relates to the command associated with the lock, and the final bit is a parity bit.

The lock control field can include two general commands and three commands that are specific to particular locks. The general commands are a NULL command represented by a binary 10101 (not including the parity bit) and a RESET command represented by binary 10100. The NULL command does not cause any change to the locks, while the RESET command causes all locks currently owned by the particular processing device to be reset during the next HMC control word in the instruction stream.

The commands specific to particular locks include an ADD command, a CHANGE command and a RELEASE command. For the ADD command, the first four binary bit positions identify the particular lock (of the 10 available), and the final bit, being a binary 1, identifies the command as an ADD. The ADD commands for the 10 locks are as follows:

| | |
|---|---|
| 00001 | ADD Lock 0 |
| 00011 | ADD Lock 1 |
| 00101 | ADD Lock 2 |
| 00111 | ADD Lock 3 |
| 01001 | ADD Lock 4 |
| 01011 | ADD Lock 5 |
| 01101 | ADD Lock 6 |
| 01111 | ADD Lock 7 |
| 10001 | ADD Lock 8 |
| 10011 | ADD Lock 9 |

In the CHANGE command, the initial four binary positions again represent the lock involved. The final binary bit is a 0, identifying the command as a CHANGE. For example, binary 00000 represents a command to CHANGE to lock 0, while a binary 01100 is a command for changing to lock class 6. A CHANGE command releases any locks currently held, then adds only the lock identified in the CHANGE command.

The RELEASE command is identified by a binary 1 in the first bit position, followed by an identification of the inverse of the particular lock in the final four bit positions, as follows:

| | |
|---|---|
| 11111 | RELEASE Lock 0 |
| 11110 | RELEASE Lock 1 |
| 11101 | RELEASE Lock 2 . . . |
| 10110 | RELEASE Lock 9 |

The LOCK commands come from the control store output registers (32, 66, 68 and 70) and are then put into the Mp A registers (138, 168, 170 and 172). Then, they are transmitted to the corresponding MP fields, e.g. data bus 200 in connection with output register 138, and then to the corresponding input registers, i.e. input registers 178, 182 and 186 in connection with output register 138.

Figure 6:
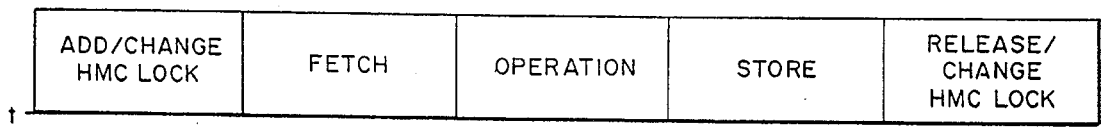
FIG. 6 is a generalized timing diagram of an operation on data performed by the processing devices utilizing hardware locks.

FIG. 6 illustrates, in a somewhat simplified and generalized manner, an operation on data utilizing one of the horizontal microcode (HMC) class locks. Before performing the task or operation, one of processors 18–24 gains control of the desired lock as explained above, either through an ADD command or a CHANGE command. Once in control of the lock, the processor fetches the shared data, i.e. the data which is protected by the lock now under control. Once it has acquired the data, the processor performs the desired operation upon the data in accordance with one or more HMC instructions (control words). Upon completion of the operation, the processing device stores the shared data to main storage memory. The processor relinquishes control of the lock, either by a RELEASE command or a CHANGE command. None of the other processing devices is able to fetch the shared data without gaining control of the lock, and none of the devices can acquire the lock until it is released by the processing device currently in control.

Various commands relating to the class locks are implemented through sequencers associated with the lock registers such as register 148. An MP locking sequencer tracks the locking and unlocking activity of an associated processing device. The MP locking sequencer knows when the associated processor owns one or more locks, and is also responsible for releasing locks. When a store is done with any lock active in the associated processor, the MP locking sequencer does not release that lock until the store has been completed, including any purges from the MP or cash directories. The MP locking sequencer tracks the associated processor and generates an MSC holdoff when there is a lock conflict. This is to tell the processor when to wait for the resolution of a conflict. The MP locking sequencer has includes a Mode (ILF) sequencer with three subsections designated IDLE, LOCKED and FREE. The ILF sequencer tracks whether any locks are possessed by its associated processor, and if so, are we attempting to release them. The other sequencer is a WHERE IS STORE or WIS sequencer which tracks any stores that are queued while a lock is held until the final store has been completed and the MP and cash directories have been updated, if necessary.

Figure 7A:
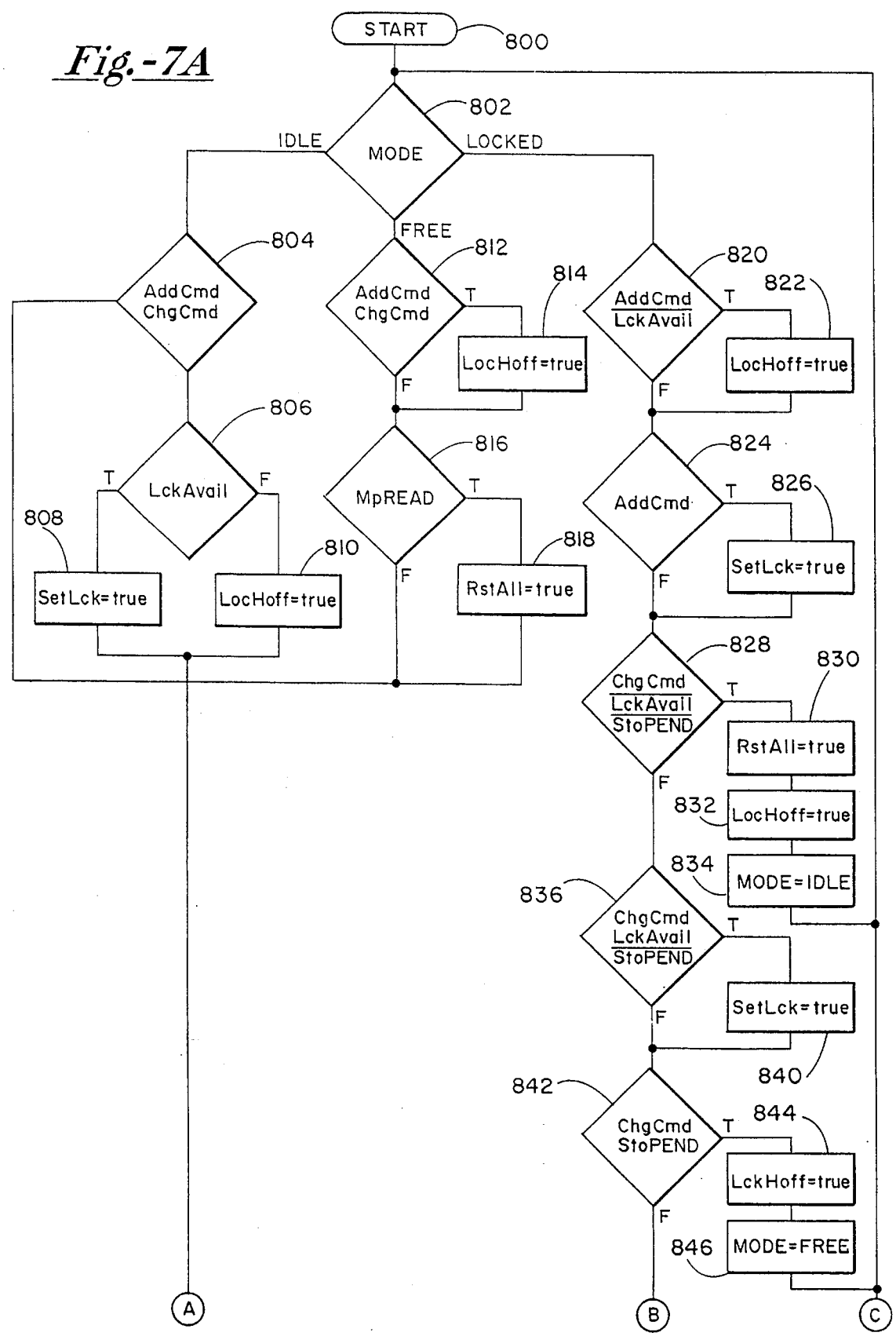
FIG. 7 is comprised by FIGS. 7A and 7B which is a flow chart illustrating the operation of a lock sequencer utilized by the processing devices.
Figure 7B:
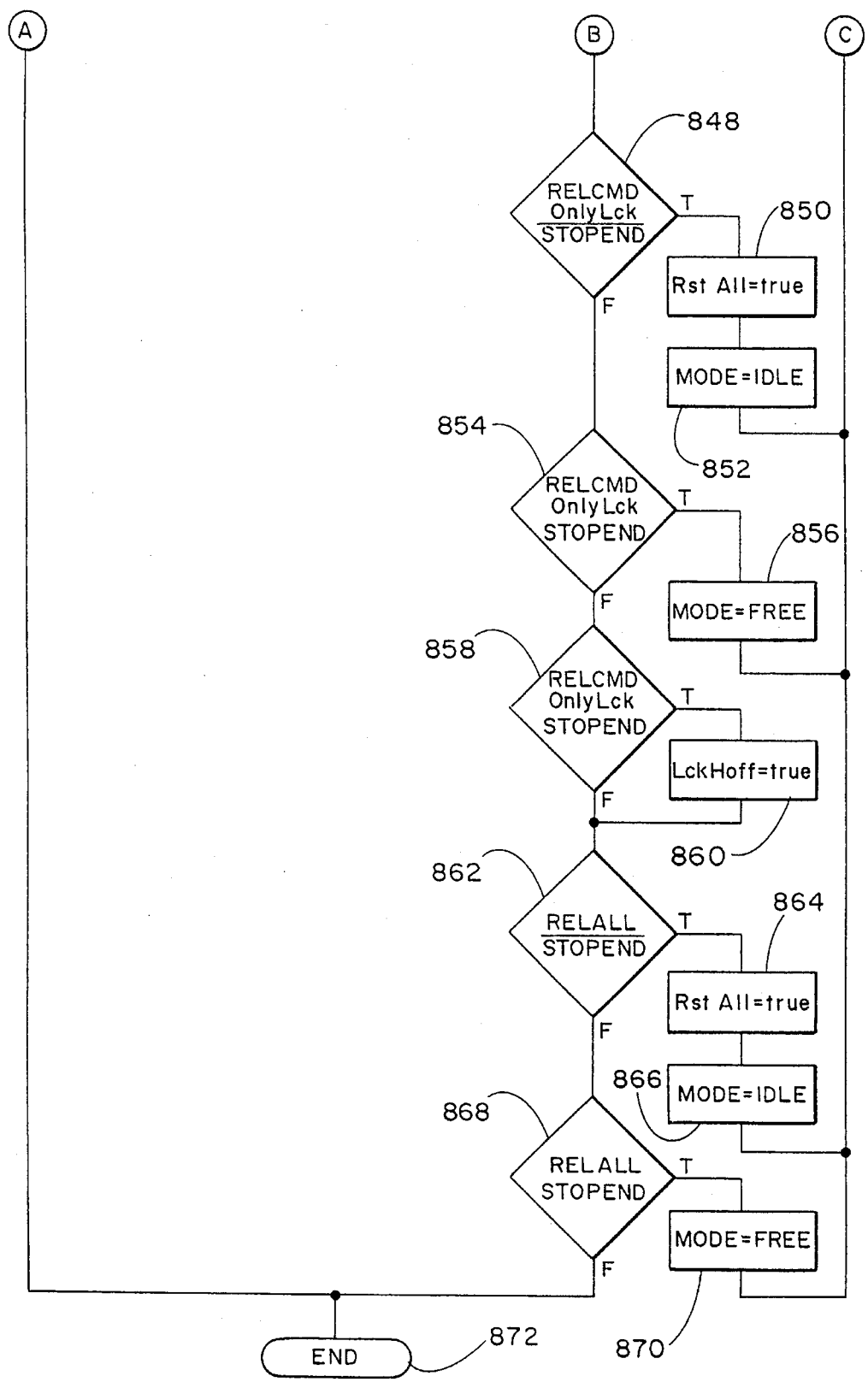

The ILF sequencer is described herein with reference to FIG. 7. In one preferred embodiment of the invention, the sequencer is embodied in microcode following the logic flow of the diagram. The sequencer begins with a mode state 802, either IDLE, LOCKED or FREE, represented respectively by binary bit patterns 00, 10, and 01. The 11 binary state is an illegal state used for verification of the mode input state.

The IDLE state indicates that no locks are held. The processor may be held off waiting for a lock to become available. If a lock is requested and granted then the ILF sequencer will go to LOCKED state.

The LOCKED state indicates that at least one lock is held. From the LOCKED state, the sequencer can go to either the IDLE or FREE states. To exit LOCKED, the horizontal microcode must release all locks held by this processor.

Locks can be released in several ways, including the CHANGE command, RELEASE command and RESET all locks. If there is an outstanding store that issued when a lock was held, it is tracked by the WIS sequencer, and the IDLE, LOCKED, FREE sequencer goes to the free state. If there is no outstanding store, the ILF sequencer goes to IDLE. The FREE state indicates the horizontal microcode has released the last lock or locks, but there is a store covered by the lock or locks still outstanding. The hardware retains the lock or locks until the store is complete. The mode sequencer goes to IDLE when the outstanding store is done.

Referring now to FIG. 7, the IDLE, LOCKED, FREE sequencer starts at 800 where the mode of the system is input to block 802. The condition of the mode state is checked and, if the mode state is idle, the process flows to 804. If the mode state is FREE, the process flows to 812. If the mode state is LOCKED, the process flows to 820.

If the state is IDLE, there is a check at 804 on two of the variables in the sequencer which are the ADD command and CHANGE command variables. If both the ADD command, represented by ADDCMD, and CHANGE command, represented by CHGCMD, are true, then the process flows to 806. If not true, then the process flows to 872. Then the process flows to 806 to check the available lock. If the lock is available, the process flows to 808 where the set lock variable is set true. If the lock available test is false, then the process flows to 810 where the lock holdoff is set true. In either case the process then flows to block 872.

If the IDLE, LOCK and FREE sequencer is in the FREE state, the process flows to 812 where the ADD command (ADDCMD) and CHANGE commands (CHGCMD) are checked for true. Lock HOLD OFF (LOKHOFF) is set true and the process flows to MPREAD 816. If the result of the ADD command and CHANGE command logical evaluation at 812 is false, then the process flows to the MPREAD state at 816. If the MPREAD state is valid at block 816 the process flows to resetting all locks 818, the ILF sequencer then ends.

If the IDLE LOCK and FREE sequencer is in the LOCK state, the process sequences through ten checks of the ADD command, LOCK available, store pending, and CHANGE mode states. The first check is for an ADD command when there is not a lock available at 820. If these logical conditions are true then the LOCK HOLDOFF is set TRUE at 822. If they are false, the process flows to check if there is an ADD command at 824. If this logical condition is true then the lock that we are requesting at 826 is set to true and the process flows to 828. If there is not an ADD command state at 824 then the condition is false at 824 and the process flows to 828. At 828 a CHANGE command, lock available, and store pending check is made such that when there is a CHANGE command but not a LOCK available and not a store pending 828 three things happen: reset all locks at 830, set up a LOCK HOLDOFF at 832 and send the sequencer into the IDLE mode at 834. If the condition at 828 is false then the process flows to the check out for a CHANGE command, LOCK available, and NO STORE pending. If this logical condition is true 836 then the process flows to 840 where we set the LOCK process is set to true. The process then flows to 842 where it is checked for CHANGE mode and STORE PENDING true. If this condition is true then LOCK HOLDOFF is set at 844 and the ILF sequencer mode is set to FREE.

If either of the CHANGE mode and STORE PENDING is false, the process flows to 848 where the RELEASE command, and ONLY LOCK and NOT STORE PENDING are checked. If this logical condition is true, the process flows to 850 where all locks are reset and the ILF sequencer mode is set to IDLE at 852. If the condition at 848 is false then the process flows to 854. If there is a RELEASE command and only LOCK and STORE PENDING are true the ILF sequencer mode is set to FREE at 856. IF the result of the conditional check at block 854 is false the process flows to block 858 where a check is made to determine whether the RELEASE LOCK and STOP PENDING states are true. If the result of this check is true then the process flows to 860 and the requested lock is held off. If the result of the conditional checking at block 858 is false then the process flows to 862 for a check of RELEASE ALL and NOT STORE PENDING states. If the result of conditional check of block 862 is true then all locks are reset at 864 and the ILF sequencer mode is set to IDLE at 866. If the result of the conditional check at 862 is false then the process flows to 868 where the RELEASE ALL and the store pending states are checked for true then the mode is set to FREE at 870. If the result of the condition in 868 is false then the sequencer ends.

The second part of the MP locking sequencer is the Where Is Store or WIS sequencer. The purpose of the WIS sequencer is to track store commands which are issued under one or more locks. The most recent store command that is locked will be tracked. The WIS sequencer can be in a number of states including NULL, RAB1, RAB2, RAB3, MSCMD and MPREAD.

The NULL state indicates that there is not a store issued under a lock that is waiting to be completed.

The state RAB3 indicates that there is currently a store issued under a lock waiting to be completed. The store command is currently in the main store command queue in the third position, e.g., in real address buffer 54 if processor 18 is involved.

The RAB2 state indicates that there is currently a store issued under a lock waiting to be completed. The store command is currently in the main store command sequence in the second position.

The RAB1 state indicates there is already a store issued under a lock waiting to be completed. The store command is currently in the main store command queue in the first position.

The MSCMD state indicates there is currently a store issued under a lock in the main store command register waiting for its turn to go on the MS bus. The state MPREAD indicates that the store has been done but to hold the lock until the MP directory has been purged, if necessary.

The WIS sequencer states in one preferred embodiment of the invention includes the NULL state represented by binary 000, the RAB3 state represented by binary 110, the RAB2 state represented by binary 100, the RAB1 state represented by 010, the MSCMB represented by 011, the MPREAD state represented by 001, and illegal states can be represented by 111 and 101. The WIS sequencer calculates the state it should be in under the following conditions. If the LDRA 3 state and LOCKED state are true then the sequencer is in state RAB3 at 906. If the LDRA2 and LOCKED are true then the WIS sequencer is in state RAB2 at 904. If the LDRA1 and LOCKED is true then the WIS sequencer is in state RAB1 at 902. If the LDMSC and LOCKED states are true then the WIS sequencer is in the MSCMD state at 908 and if IDLE then the WIS sequencer is in the NULL state.

Figure 8:
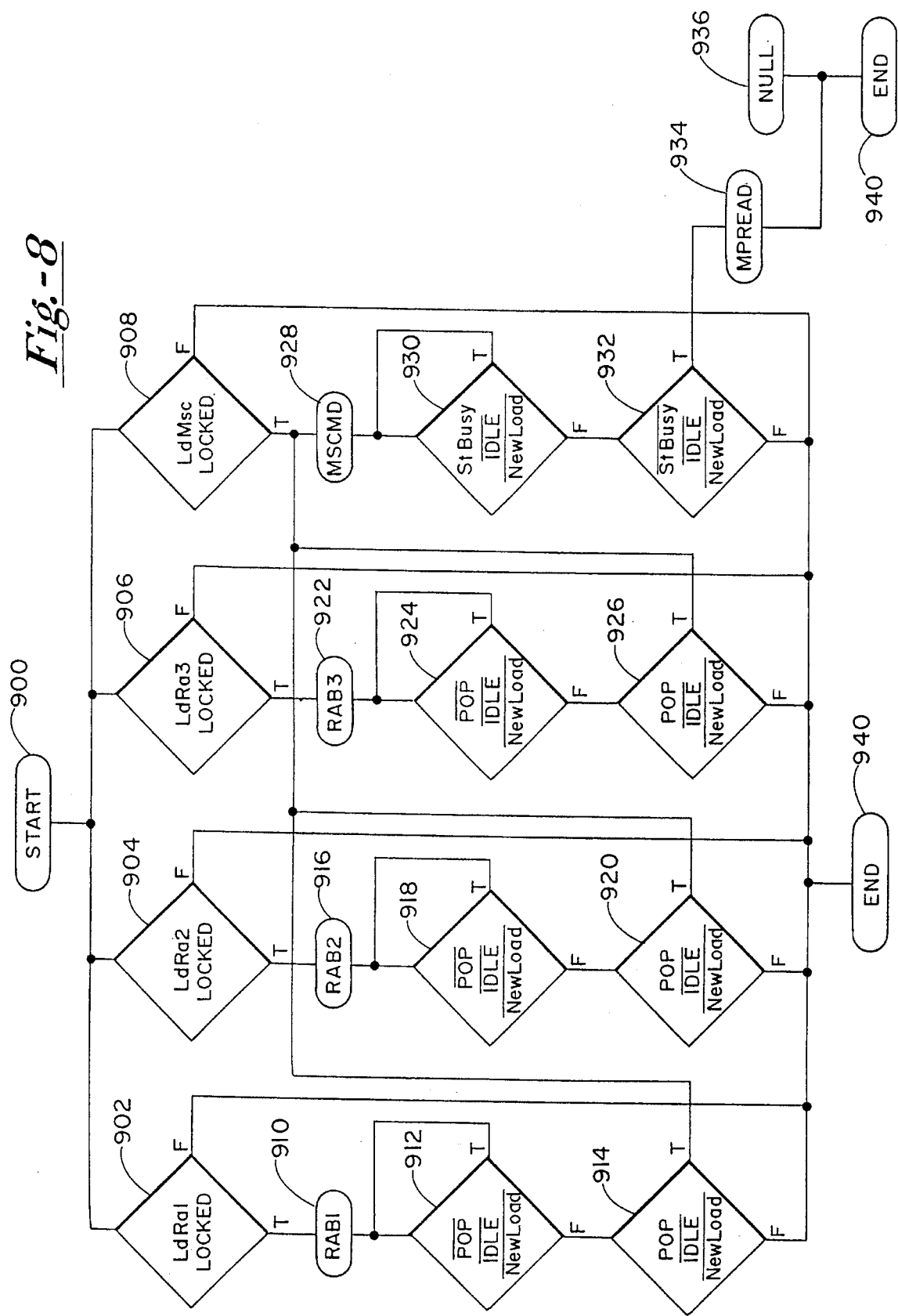
FIG. 8 is a flow chart illustrating the operation of a store-tracking sequencer used by the processing devices.

FIG. 8 shows a diagram of the process flow for the WIS sequencer. The RAB1 state 910, RAB2 state 916, RAB3 state 222, MSCMD state 928, MPREAD state 934 and NULL state 936 are represented on the diagram. In the RAB1 state 910 the process first checks if the POP, IDLE and NEW LOAD variables are not true. If they are all not true then the WIS sequencer stays in the RAB1 state. If any one of them is true then the WIS sequencer checks whether POP is true. If IDLE is not true and NEW LOAD is not true then the sequencer returns to the beginning of the MSCMD sequence. If conditions at 914 are false then the WIS sequencer ends at 934. Similarly the RAB2 states check whether the POP, IDLE and NEW LOAD states are false. If they are false then the process flows back to the RAB2 state. If these conditions are false at 918, then the process flows to 920 where POP, IDLE and NEW LOAD are checked. If the result of this check is false, the process ends. If this check is true, then the sequencer goes to the MSCMD state. Similarly, for RAB3 if the POP, IDLE and NEW LOAD states are all false, the process stays in the RAB3 state. If one of these are true, then the process flows to block 926. If the POP state is true then the process flows to the MSCMB state. If the POP state is false, and the IDLE and NEW LOAD states are false the process flows to 934 which ends the WIS sequencer. While in the MSCMD state 928 the WIS sequencer first checks the BUSY, IDLE and NEW LOAD states at each block 930. While these conditions are true the process stays in the MSCMD state. If these conditions are false then the process flows through to check if the states next BUSY, NOT IDLE and not NEW LOAD are true 932 then the process flows to the MPREAD 934 and if the MPREAD conditions are not met (discussed above), the sequence ends at 940.

Figure 9:
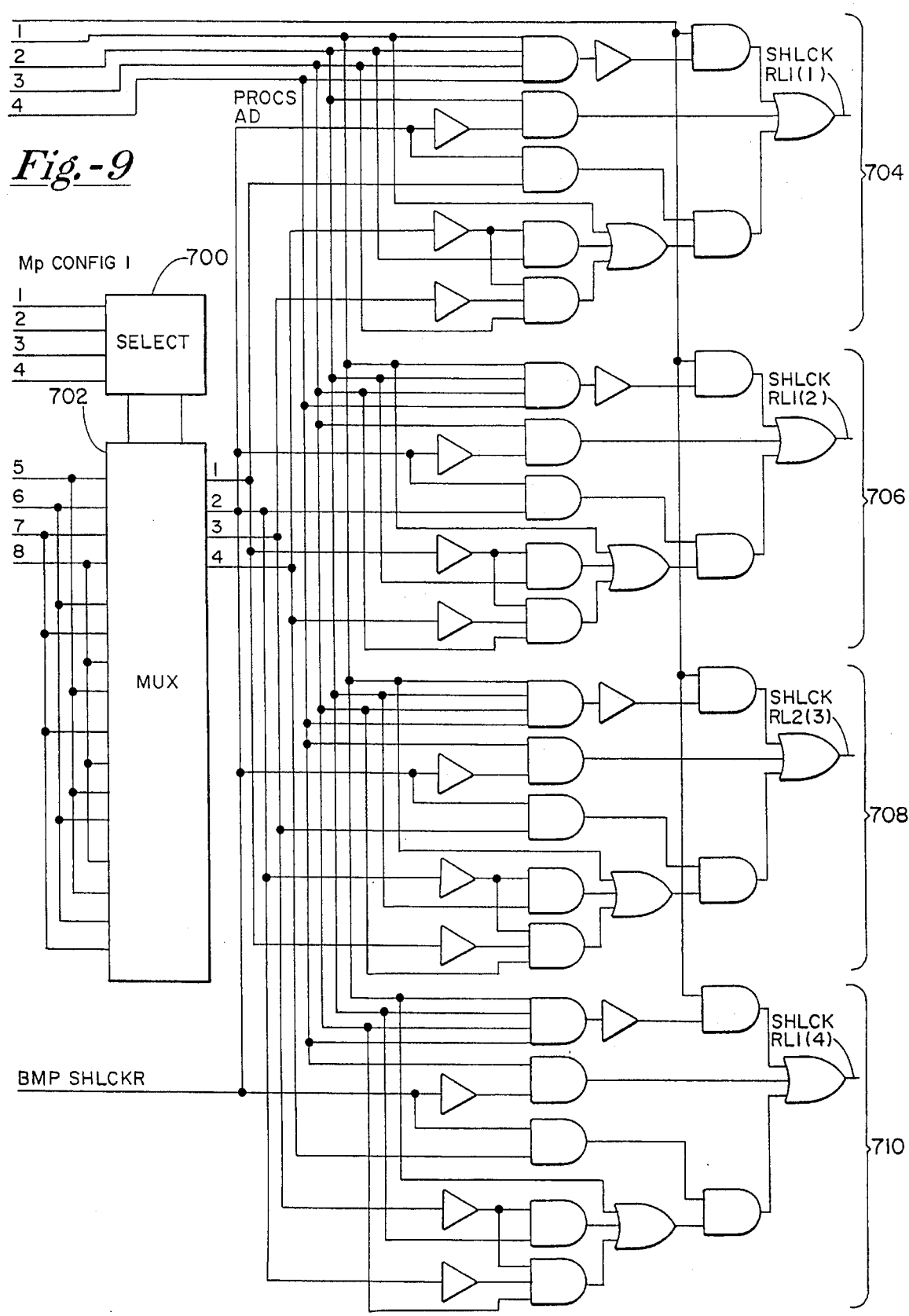
FIG. 9 is a schematic diagram of a mechanism for resolving simultaneous processing device requests for hardware locks.

Referring now to FIG. 9, a schematic diagram of the simultaneous HITLOCK resolution mechanism is shown. The simultaneous HITLOCK resolution register determines which processor has the highest priority when more than one processor requests the same lock at the same time. It is loaded on the first process cycle from the initial tie breaker load.

After initial tie breaker load occurs, any time a signal called BmpSHLckR bumps the simultaneous HITLOCK register as active, the single bit indicates a rotation to the next installed processor. The processor with the single bit on (binary one) has the lowest priority. The processor to the right of the one bit has highest priority. From the first cycle the register will initialize to all 0s but after initializing it will have only one bit on. BmpSHLckR has two sources which are selected by the signal MPCONFIG bit 9. If MPCONFIG bit 9 is 0 then SHLCKR will rotate at random times approximately 50% of the time. The random generator is fifteen bits repeating every $2^{TM}$ cycle. If MPCONFIG is a one, then anytime a lock is granted the single bit on the SHLCKR will rotate to the next installed processor.

It is important that the SHLCKR low priority bit rotate only through the bits that correspond to the installed processors. IF it was to rotate through all bits it would bias the priority to one processor giving it more possibility of obtaining locks than the others.

Remember that MPCONFIG (1 to 4) is the processors ID, and that the MPCONFIG (5 to 8) are the processors installed. INCARB is the output from the random generator that says to bump SHLCKR if selected. And SETANY-LOCK is active any time a lock is granted.

The Simultaneous Hit LoCK Resolution (SHLCKR) scheme is implemented in hardware as shown in FIG. 10. In FIG. 10 the MPCONFIG register bits 1, 2, 3 and 4 enter a select mechanism whereby if line 1 is high, the select lines out are 00. If line 2 is high the select lines are 01. If line 3 is high, the select lines out are 10. If line 4 is high, the select lines out are 11. The select lines are used to select between 4 inputs of 4 bits wide of the MPCONFIG bit 7, 5, 6, 7 and 8 for the 00, case lines 6, 7 and 5 are selected for the 01 case, lines 7, 8 and 6 are selected for the 10 case, and lines 8, 5 and 7 are selected in the 11 case.

The block 702 generates the ProcsAD vector of 4 bits 1, 2, 3 and 4. ProcsAD as well as the bump BmpSHLckR bit and the InitTie line plus the SCHLCKR 2 vector are input to this preferred embodiment of the invention simultaneous hit lock mechanism. The resolution logic is illustrated in. FIG. 9. The generation of the SHLCKRL1 bit 1 is shown in logic group 704. The generation of SHLCKRL12 is set up to describe in logic group 706. The generation of SHLCKRL2 bit 3 is shown in logic group 708. The generation of SHLCKRL1 bit 4 is shown in logic group 710. The logic group 704 can be understood by reviewing its logical implementation. The output of SHLCKRL1 of 1 depends on the InitTie following state variables: SHLCKRL2 bits 1–4, SHLCKRL2 bit 1, BmpSHLckR and ProcsAD bits 1–4. The logic implements the following algorithm:

If any of the following three sets of logic is true then the output SHLCKRL1 bit 1 will be true.

Set 1: InitTie bit 1 is true and the vector SHLCKRL2 bits 1–4 are all zeros.

Set 2: SHLCKRL2 bit 1 and not BmpSHLckR.

Set 3: BmpSHLckR and ProcsAD bit 1 are true and the following quantity is true: SHLCKRL2 bit 4 or SHLCKRL2 bit 3 and not ProcsAd bit 4 or SHLCKRL2 bit 2 and not ProcsAD bit 3 and not ProcsAD bit 4.

If any of the following three sets of logic is true then the output SHLCKRL1 bit 2 will be true.

Set 1: InitTie bit 2 is true and the vector SHLCKRL2 bits 1–4 are all zeros.

Set 2: SHLCKRL2 bit 2 and not BmpSHLckR.

Set 3: BmpSHLckR and ProcsAD bit 2 are true and the following quantity is true: SHLCKRL2 bit 1 or SHLCKRL2 bit 4 and not ProcsAd bit 1 or SHLCKRL2 bit 3 and not ProcsAD bit 1 and not ProcsAD bit 4.

If any of the following three sets of logic is true then the output SHLCKRL1 bit 3 will be true.

Set 1: InitTie bit 3 is true and the vector SHLCKRL2 bits 1–4 are all zeros.

Set 2: SHLCKRL2 bit 3 and not BmpSHLckR.

Set 3: BmpSHLckR and ProcsAD bit 3 are true and the following quantity is true: SHLCKRL2 bit 2 or SHLCKRL2 bit 1 and not ProcsAd bit 2 or SHLCKRL2 bit 4 and not ProcsAD bit 1 and not ProcsAD bit 2.

If any of the following three sets of logic is true then the output SHLCKRL1 bit 4 will be true.

Set 1: InitTie bit 4 is true and the vector SHLCKRL2 bits 1–4 are all zeros.

Set 2: SHLCKRL2 bit 4 and not BmpSHLckR.

Set 3: BmpSHLckR and ProcsAD bit 4 are true and the following quantity is true: SHLCKRL2 bit 3 or SHLCKRL2 bit 2 and not ProcsAd bit 3 or SHLCKRL2 bit 1 and not ProcsAD bit 2 and not ProcsAD bit 3.

FIG. 10 shows a tie breaking logic circuit used to resolve contentions among processors 18, 20, 22 and 24 for control of the hardware class locks. While separate logic gates are depicted for convenience in illustration, it should be noted that the actual implementation of this circuit is a 2×4 AND/OR circuit. A somewhat similar circuit, with different inputs, is employed to resolve contentions for interface 26 to main storage memory 28. In general, the logic circuit, responsive to sensing a contention for one of the locks, raises a "hold-off" in the processing device which loses the contest for the lock.

The logic circuit includes three four-bit comparator amplifiers, indicated respectively at 226, 228 and 230. Five OR logic gates are shown at 232–240. One or two of the OR gates associated with each comparator. The outputs of each comparator and its associated OR gates are provided to an AND logic gate, the respective AND gates indicated at 242, 244 and 246. Finally, the outputs of the AND gates, and an input 248 representing another hold-off condition, are provided to an OR logic gate 250. The output of OR gate 250 raises the hold-off condition in the "losing" processing device.

Comparator amplifier 226 receives two inputs, namely bit positions 2–5 of register Mp A and Mp B. Actually, the contents of register Mp A are compared "on the fly" with what is contained in the data bus providing input to register Mp B, e.g. data bus 202 in connection with processor 18. If a match is found, it is because the respective A and B fields identify the same hardware class lock, and comparator 226 provides a "high" logic signal to AND gate 242.

The input to OR gate 232 is either an add or change. The actual "OR" condition relates to the Mp A register: either bit position 2 is a 0 indicating a binary 0–7, or bit positions 3 and 4 are zeros, indicating a binary 0, 1, 8 or 9. In either case, the command involved is an ADD or a CHANGE. A determination that processor A does not have the requested lock is based upon the contents of lock register A, specifically the one of bit positions 0–9 corresponding to the requested lock. Finally, the determination that processor A is the lowest priority processor is based upon the position of the binary 1 in lock tie break register 166, or one of the three corresponding lock tie break registers (not shown). In this connection it should be noted that the conflict resolution logic, like the tie breaking registers themselves, is tied to the A–D sequence rather than the specific processing device identity.

Comparator amplifier 228 compares bit positions 2–5 of Mp register A and Mp bus C. Again, this is an on the fly comparison of register A with appropriate data bus, as explained above in connection with comparator 226. OR gate 234 receives the same input as OR gate 232. The indication that processor A does not have the requested lock is provided to AND gate 244. Finally, OR gate 236 provides a high logic signal to AND gate 244 if either processor A or processor B has the lowest priority.

Bit positions 2–5 of registers Mp A and Mp D are provided to comparator 230. The inputs to OR gate 238 and the input to AND gate 246 (that processor A does not have the requested lock) remain the same. Finally, OR gate 240 provides the high logic signal if the lowest priority resides in processor A, B or C. Thus, based upon duplicated logic found in all of the processing devices, any contention among processors for the same class lock is rapidly resolved, with the lock becoming active in the highest priority processing device in contention, while the hold-off condition is raised in each remaining contending processor. Each such remaining processor can not proceed with its data operation until the lock is released, whereupon the processor either gains control of the lock or loses yet another contention.

In accordance with the present invention, an interconnection among multiple processors, combined with logic duplicated among all of the processors, provides arbitration of the class locks and the interface to main storage memory independently of the main memory, for more rapid conflict resolution. The interconnection requires substantially less hardware, in that coherency among the various processors is maintained without a central hub. The hardware class locks serialize data operations based on data operation capabilities rather than specific addresses, without any need to access main storage. The provision of multiple class locks reduces the amount of contention, and permits multiple data operations to proceed simultaneously, even though a single interface ties the processing devices to main storage. Even in the event of conflict, the lock sequencer ensures that the hold-off condition in the losing processor contention, is of minimal duration.

It is to be appreciated that the preferred embodiment of four processing devices is presented as a matter of convenience, as the arbitration approach is readily adaptable to any network involving two or more processors. Enlarging the network beyond four processors involves adding the processors themselves and providing an additional data bus to be associated with each added processor. System upgrades are, thus, relatively straight forward, another advantage of the present invention.

What is claimed is:

1. An information processing network including:

a plurality of processing devices for executing computer program instructions to manipulate bid-encoded data, and a shared interface connected to the processing devices for allowing transmission of the bit-encoded data between each of the processing devices and the shared interface;

wherein each of the processing devices includes an arbitration sector containing arbitration logic for determining a priority among all of the processing devices for access to and control of the shared interface, said arbitration sectors being substantially identical to one another, and;

an interconnection means directly coupling all of the arbitration sectors to one another independently of the shared interface for transmitting the arbitration logic among all of the arbitration sectors to maintain coherency of the arbitration logic in all of the arbitration sectors, said interconnection means including a number of said arbitration data busses is equal to the number of the processing devices; and wherein each of the arbitration data busses is uniquely associated with one of the processing devices, in that each arbitration data bus is connected to the arbitration sector of its associated processing device to receive as an input the arbitration logic from the arbitration sector of its associated processing device, each arbitration data bus further being connected to the remaining arbitration sectors of the remaining processing devices to provide the arbitration logic from its associated processing device as an input to the remaining arbitration sectors;

and wherein each arbitration sector includes a plurality of arbitration registers, each arbitration register containing information specific to a different one of the processing devices, one of the arbitration registers in each arbitration sector containing arbitration information specific to the particular processing device containing it and providing the arbitration information as an input to an arbitration data bus associated with the particular processing device, each of the remaining arbitration registers of each arbitration sector comprising an input arbitration register for receiving arbitration information as an input from one of the arbitration data busses other than the associated data bus and each said arbitration data bus transmits the arbitration logic only in the direction from its associated processing device to the remaining processing devices; and an interface monitoring register in each arbitration sector for storing logic indicating the priority among the processing devices for control of the shared interface; and a bidirectional data bus connected to the shared interface, and input and output connections between each of the interface monitoring registers and the bidirectional data bus.

2. The information processing network of claim 1 wherein:

each arbitration data bus being connected to the arbitration sectors of at least two of the processing devices, receiving the bit-encoded data only from a given one of the arbitration sectors to which it is connected, and transmitting the bit-encoded data only in the direction from said given one arbitration sector to the other arbitration sectors to which it is connected.

3. An information processing network including:

a plurality of processing devices for executing computer program instructions to manipulate bit-encoded data, a shared interface connected to the processing devices, and a shared resource connected to the shared interface for transmitting bit-encoded data between each of the processing devices and the shared resource via the shared interface;

wherein each of the processing devices contains an associated set of arbitration registers, each of said sets containing arbitration logic for determining a priority among all of the processing devices for access to the shared resource via the shared interface, with each arbitration register of the associated set containing information specific to a different one of the processing devices;

wherein each of the sets of arbitration registers includes one providing register that contain arbitration information specific to its associated one of the processing devices, the remaining arbitration register of each set being receiving registers for receiving arbitration information from different ones of the other processing devices; and an interconnection means directly coupling all of the sets of arbitration registers to one another independently of the shared interface, for transmitting the arbitration logic among all of the sets of arbitration registers unidirectionally from the providing register to each of the processing devices to one of the receiving registers of each of the processing devices, to maintain coherency of the arbitration logic in all of the sets of arbitration registers, said interconnection means includes a plurality of arbitration data busses equal to the number of the processing devices, and wherein each of the arbitration data busses is uniquely associated with one of the processing devices in that each arbitration data bus is connected to the providing register of its associated processing device to receive the arbitration logic from the associated providing register, and each arbitration data bus is connected to one of the receiving registers of each of the remaining processing devices to provide the arbitration logic from its associated processing device to the remaining processing devices via their respective receiving registers.

4. The information processing network of claim 3, wherein:

the receiving register in each said set receive inputs of the arbitration information from the arbitration data busses associated with the other processing devices in a priority sequence from a highest priority one of said remaining processing devices, to a lowest priority one of the remaining processing devices.

5. The information processing network of claim 4 wherein:

each of the processing devices further contains a tie-breaking register for determining the one of said processing devices having the lowest priority among the processing devices in said priority sequence.

6. The information processing network of claim 5 further including:

a means for dynamically altering the information contained in the tie-breaking register, thereby to dynamically alter the priority among the processing devices.

7. The information processing network of claim 3 wherein:

each of the processing devices further contains an interface monitoring register for storing logic indicating the priority among the processing devices for control of the shared interface, and wherein said interconnection means further includes a bidirectional data bus connected to the shared interface, and input and output connections between each of the interface monitoring registers and the bidirectional data bus.

8. The information processing network of claim 3 wherein:

each of the processing devices further contains a configuration register containing processor identity information uniquely identifying the associated processing device.

9. An information processing network including:

a plurality of processing devices for executing computer program instructions to manipulate bit-encoded data, a shared interface connected to the processing devices, and a shared resource connected to the shared interface to allow use of the shared interface for transmitting bit-encoded data between each of the processing devices and the shared resource via the shared interface;

wherein each of the processing devices includes an arbitration sector containing arbitration logic for determining a priority among all of the processing devices for access to the shared resource via the shared interface, said arbitration sectors being substantially identical to one another, and wherein each arbitration sector includes a plurality of arbitration registers, each arbitration register containing information specific to a different one of the processing devices, one of the arbitration registers in each arbitration sector containing arbitration information specific to the particular processing device containing it and providing the arbitration information as an input to an arbitration data bus associated with the particular processing device, each of the remaining arbitration registers of each arbitration sector comprising an input arbitration register for receiving arbitration information as an input from one of the arbitration data busses other than the associated data bus and each said arbitration data bus transmits the arbitration logic only in the direction from its associated processing device to the remaining processing devices; and an interconnection means directly coupling all of the arbitration sectors to one another independently of the shared interface for transmitting the arbitration logic among all of the arbitration sectors to maintain coherency of the arbitration logic in all of the arbitration sectors, said interconnection means including a plurality of the arbitration data busses equal to the number of the processing devices and wherein each of the arbitration data busses is uniquely associated with one of the processing devices, each arbitration data bus being connected to the arbitration sectors of at least two of the processing devices receiving the bit-encoded data only from a given one of the arbitration sectors to which it is connected, and transmitting the bit-encoded data only in the direction from said given one arbitration sector to the other arbitration sectors to which it is connected in that each arbitration data bus is connected to the arbitration sector of its associated processing device to receive as an input the arbitration logic from the arbitration sector of its associated processing device, each arbitration data bus further being connected to the remaining arbitration sectors of the remaining processing devices to provide the arbitration logic from its associated processing device as an input to the remaining arbitration sectors, whereby each said arbitration data bus transmits the arbitration logic only in the direction from its associated processing device to the remaining processing devices.

* * * * *